(12) United States Patent
Noguchi et al.

(10) Patent No.: US 6,472,129 B2
(45) Date of Patent: *Oct. 29, 2002

(54) FLUORINE-CONTAINING EPOXY RESIN COMPOSITION, AND SURFACE MODIFICATION PROCESS, INK JET RECORDING HEAD AND INK JET RECORDING APPARATUS MAKING USE OF THE SAME

(75) Inventors: Hiromichi Noguchi, Hachioji; Akihiko Shimomura, Yokohama; Isao Imamura; Tamaki Sato, both of Kawasaki, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,083

(22) Filed: Mar. 8, 1999

(65) Prior Publication Data

US 2002/0058210 A1 May 16, 2002

(30) Foreign Application Priority Data

Mar. 10, 1998 (JP) ............................................. 10-057638

(51) Int. Cl.$^7$ .................. C08G 59/20; C08G 59/68; G03F 7/16; B41J 2/01; B41J 2/135
(52) U.S. Cl. .................. 430/326; 430/324; 430/328; 430/329; 347/45; 528/403
(58) Field of Search .................. 347/45, 105; 528/403; 430/323, 324, 325, 326, 328, 302, 329; 549/559

(56) References Cited

U.S. PATENT DOCUMENTS

| 4,980,443 A | * 12/1990 | Kendziorski et al. .......... 528/31 |
| 5,043,747 A | 8/1991 | Ebisawa et al. ......... 346/140 R |
| 5,178,959 A | * 1/1993 | Eckberg et al. ............. 428/447 |

FOREIGN PATENT DOCUMENTS

| EP | 0 572 179 A2 | 12/1993 |
| EP | 0 779 337 A1 | 6/1997 |
| JP | 02-039944 | 2/1990 |
| JP | 2-153930 | * 6/1990 |
| JP | 03-007781 | 1/1991 |
| JP | 06-328698 | 11/1994 |

OTHER PUBLICATIONS

"Synthesis and Properties of a Novel Fluorine–Containing Alicyclic Diepoxide", T. Maruno, et al., Macromolecules, vol. 29, No. 6, Mar. 11, 1996.
Patent Abstracts of Japan, vol. 016, No. 098 (C–0918), Mar. 11, 1992, with respect to JP 03 277,676 A of Dec. 9, 1991.

* cited by examiner

Primary Examiner—Shean C. Wu
(74) Attorney, Agent, or Firm—Fitzpatrick, Cella, Harper & Scinto

(57) ABSTRACT

The fluorine-containing epoxy resin composition of the present invention comprises a fluorine-containing epoxy resin having in one molecule at least one perfluoroalkyl group having 6 to 12 carbon atoms and at least two alicyclic epoxy groups, and a cationic polymerization catalyst.

11 Claims, 3 Drawing Sheets

FLUORINE-CONTAINING EPOXY RESIN COMPOSITION, AND SURFACE MODIFICATION PROCESS, INK JET RECORDING HEAD AND INK JET RECORDING APPARATUS MAKING USE OF THE SAME

BACKGROUND OF THE INVENTION

1. Field of the Invention

The present invention relates to a polymerizable resin composition that enables water-repellent and ink-repellent treatment in a desired pattern, and more particularly to a resin composition capable of polymerizing by irradiation with ultraviolet light to form a coating in a desired pattern. The present invention also relates to a process for surface modification making use of such a composition, an ink jet recording head subjected to ink-repellent-treatment by the use of the composition, and an ink jet recording apparatus making use of the same.

2. Related Background Art

In various technical fields, there is commonly known a method of applying a water-repellent coating material to a member required to have water resistance or ink repellency so as to be endowed with such properties. Resin materials and coating materials used therefor have been developed.

As water- and oil-repellent coating materials, fluororesin- and silicone resin-type coating materials are most commonly available. Specifically, fluorine type coating materials having a fluoroolefin or perfluoro group are very stable both thermally and chemically, are excellent in weathering resistance, water resistance, chemical resistance, solvent resistance, or the like, and are also excellent in release properties, wear resistance and water repellency, thus they are widely used for various purposes. Silicone resins have good water repellency and oil repellency but have a low hardness alone, and, for such a reason, are often combined with other types of resins such as acrylic resin, epoxy resin, urethane resin and so on or modified to make up coating material compositions.

Meanwhile, in the ink jet (liquid jet) recording heads by which a liquid is discharged from discharge openings in the form of small droplets to cause the liquid to adhere to paper or the like to thereby perform recording or form images, there have been improvements in performance such as smaller droplets, higher driving frequency and a larger number of discharge openings in order to improve the recording characteristics. Accordingly, it has become more and more important to surface treatment of the discharge opening surface so that the surface state can always be kept constant with ease.

However, by use of such existing water- and oil-repellent coating materials, it is difficult to surface treatment of the discharge opening surface selectively, or precisely in a pattern, in such a way that the ink does not adhere to the surface. The reasons therefor are as follows:

(1) In order to impart properties like those of photoresists, a substance (compound) having a photosensitive functional group must be used as a main component. However, from the viewpoint of synthesis techniques, it is not easy to design molecules so that such a compound can have water repellency and ink repellency at the same time.

(2) The surface treatment of an ink jet recording head must be made in a very small layer thickness of several $\mu$m or less so as not to obstruct the function of minute nozzles. However, it is difficult to control the existing coating materials so as to have such a layer thickness.

In instances where the surface treatment has been attained by the existing fluorine type materials, the structure of coatings must be so designed as to be able to maintain the surface properties for a long term. However, most water- and oil-repellent materials have so low a coating hardness as to have a poor wear resistance, or may cause a lowering of water and oil repellency with occurrence of contamination and can be restored with difficulty in many cases. In this sense, they can not necessarily be satisfactory as materials for the surface treatment of discharge opening surfaces of ink jet recording heads.

Thus, at present, the ink discharge openings used in the ink jet recording system where an ink is ejected in the form of small droplets to effect recording are expected to have the performances shown below.

(1) The ink as the residue of ink columns having turned into droplets are held back immediately into the discharge opening.

(2) Ink droplets having adhered to the surface are swept out with ease by cleaning operation.

(3) The discharge opening surface of the recording head is excellent in scratch resistance against cleaning operation and paper carrying.

(4) In repeated liquid droplet formation and ink refilling, a meniscus is formed at the position of the discharge opening surface.

(5) The normal direction of the meniscus is in the direction of discharge.

(6) Even with a low surface tension of a ink used or under a small negative pressure, an interfacial tension, i.e., a contact angle, high enough to form a meniscus is retained.

(7) Since ink jet recording liquid is mostly adjusted to have a basic of pH of 7 to 11 for providing dissolution stability, structural materials are selected which can provide structural members with excellent alkali resistance and hydrolysis resistance.

The reason for requiring these performance characteristics is that, in the ink jet recording head, any recording liquid such as ink which adheres to the circumference of the discharge openings directly affects printing performance in that it causes aberration in the discharge (flying) direction of liquid droplets discharged from the discharge openings to make it impossible to effect printing at a high precision.

As the prior art concerning the present invention, publications are available which disclose formation of a resin thin film by gas phase polymerization using a lacquer type fluororesin coating material, a fluorine type ultraviolet-curing coating material, a heat-curing fluororesin coating material, a fluorine type silane coupling agent or an epoxy resin composition having fluororesin particles dispersed therein.

For example, Japanese Patent Application Laid-Open No. 2-39944 discloses carrying out ink-repellent treatment with a polymer having a fluoroacetyl group and a silazane group. Such a coating material, however, could not necessarily achieve both the water repellency and the durability of coatings in some cases.

Japanese Patent Application Laid-Open No. 3-7781 also discloses an ink-repellent treating agent using a glycidyl ether derived from a fluorine type diol. A fluorine type epoxy resin disclosed therein was cured when used, and hence was advantageous in the durability of coatings, but was not satisfactory in ink repellency.

Japanese Patent Application Laid-Open No. 6-328698 also discloses a method and a material for making openings with an excimer laser which is a breaking active energy ray. The method disclosed therein can achieve a superior processing precision and is useful for the production of ink jet recording heads suited for the method, but may be applied with difficulty to ink-repellent treatment using photolithography for attaining more precise processing.

Thus, under the existing circumstances, when the conventional materials and methods are adopted, no surface treatment has been obtained which provides water-repellent and ink-repellent treatment with high precision and durability, and there is a continuing need for improvement.

SUMMARY OF THE INVENTION

An object of the present invention is to provide a resin composition for water-repellent treatment promising the above performance characteristics as coatings.

Another object of the present invention is to provide a fluorine-containing epoxy resin composition suited as a water-repellent material or water-repellent coating material applied to places having opportunities of contact with solutions or materials containing components that may damage film-forming properties or adhesion of water repellent materials, such as polar organic solvents, and also to provide an ink jet recording head endowed with a good ink repellency by the use of such a composition, and an ink jet recording apparatus making use of such a recording head.

Still another object of the present invention is to provide a fluorine-containing epoxy resin composition comprising:

a fluorine-containing epoxy resin having in one molecule at least one perfluoroalkyl group having 6 to 12 carbon atoms and at least two alicyclic epoxy groups, and a cationic polymerization catalyst. Incidentally, the term "perfluoroalkyl group" is meant to be an alkyl group all the hydrogen atoms of which have been substituted with fluorine atoms.

As the above fluorine-containing epoxy resin used in the present invention, the epoxy compound represented by the following Formula (A-1) may preferably be used.

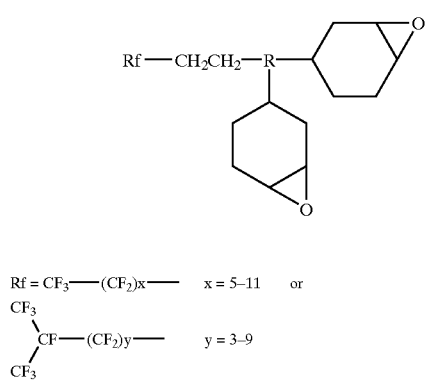

(A-1)

$Rf = CF_3$—$(CF_2)x$—  x = 5–11 or $CF_3$
  \
   $CF$—$(CF_2)y$—   y = 3–9
  /
$CF_3$

In the above formula, R is an aliphatic residue for linking monomers each having an alicyclic epoxy group.

As the above fluorine-containing epoxy resin used in the present invention, the epoxy compound represented by the following Formula (A-2) may preferably be used.

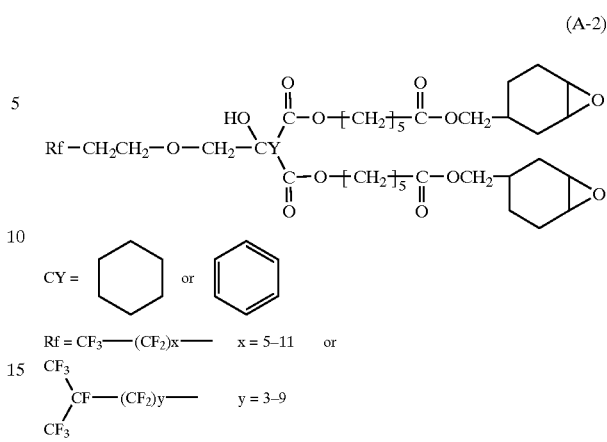

(A-2)

$CY =$ ⬡ or ⬡

$Rf = CF_3$—$(CF_2)x$—  x = 5–11  or $CF_3$
  \
   $CF$—$(CF_2)y$—   y = 3–9
  /
$CF_3$

Further, as the above fluorine-containing epoxy resin used in the present invention, the epoxy compound represented by the following Formula (A-3) may preferably be used.

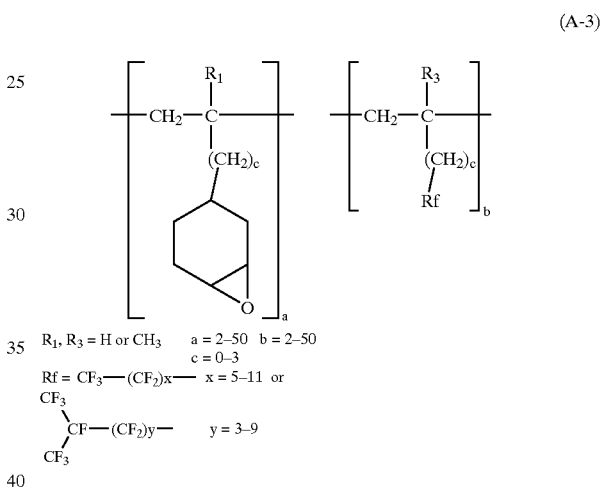

(A-3)

$R_1, R_3 = H$ or $CH_3$   $a = 2$–50  $b = 2$–50
                          $c = 0$–3
$Rf = CF_3$—$(CF_2)x$—  x = 5–11 or
$CF_3$
  \
   $CF$—$(CF_2)y$—   y = 3–9
  /
$CF_3$

Further, as the above fluorine-containing epoxy resin used in the present invention, the epoxy compound represented by the following Formula (A-4) may preferably be used.

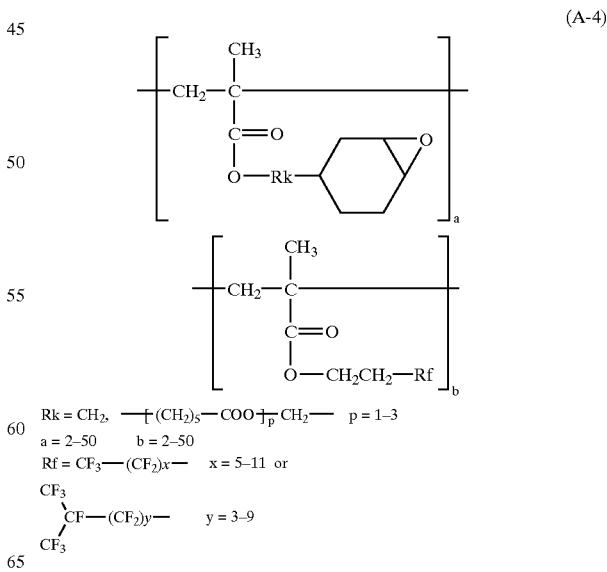

(A-4)

$Rk = CH_2$,  —$(CH_2)_5$—$COO$—$CH_2$—  $p = 1$–3
$a = 2$–50   $b = 2$–50
$Rf = CF_3$—$(CF_2)x$—  x = 5–11 or
$CF_3$
  \
   $CF$—$(CF_2)y$—   y = 3–9
  /
$CF_3$

Furthermore, as the above fluorine-containing epoxy resin used in the present invention, the epoxy compound represented by the following Formula (A-5) may preferably be used.

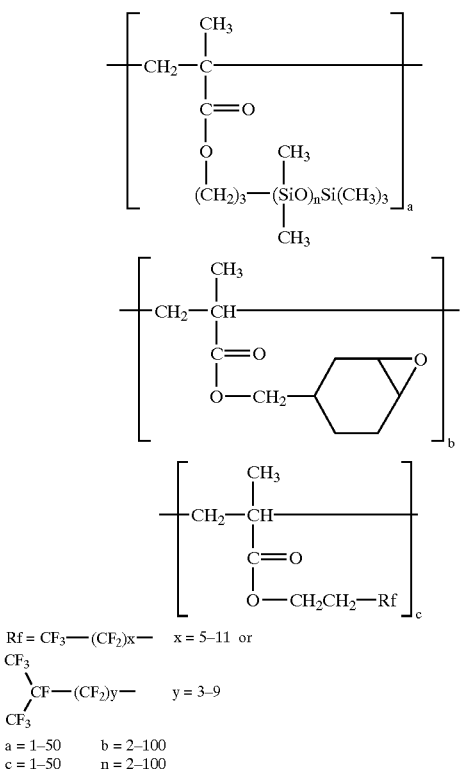

(A-5)

Rf = CF₃—(CF₂)x—  x = 5–11 or
CF₃
 \
  CF—(CF₂)y—  y = 3–9
 /
CF₃
a = 1–50  b = 2–100
c = 1–50  n = 2–100

The fluorine-containing epoxy resin composition of the present invention may further be incorporated with, as a compatibilizing agent, at least one of compounds represented by the following Formulas (C-1) and (C-2).

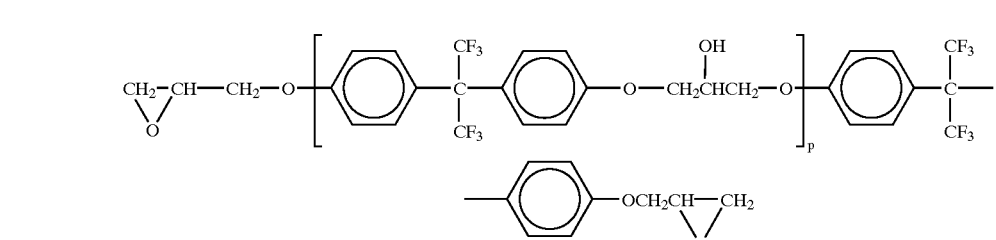

P = 0–2

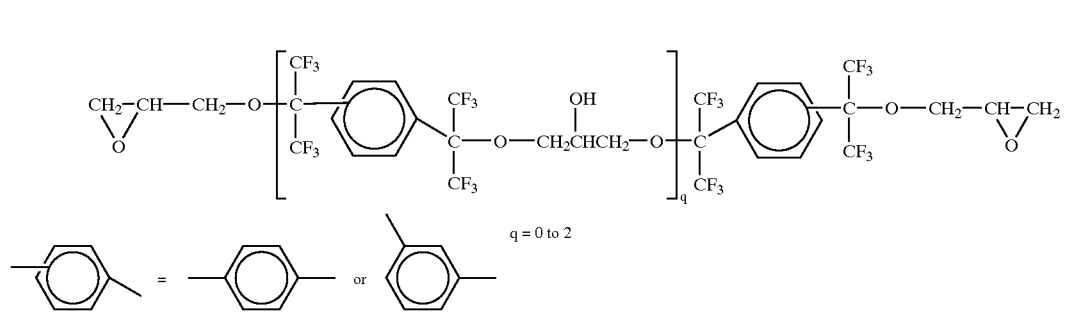

q = 0 to 2

Still another object of the present invention is to provide a surface treatment process for treating a surface of a substrate selectively, the process comprising successively:

the first step of applying the fluorine-containing epoxy resin composition of the present invention onto a substrate and drying the applied resin composition;

the second step of irradiating the applied composition with an activation energy ray in a pattern through a mask;

the third step of dissolving and removing a part of the applied composition not irradiated with the activation energy ray, by use of a liquid capable of dissolving the composition; and if desired the fourth step of post-curing the remaining composition.

Yet another object of the present invention is to provide a surface treatment process for treating a surface of a substrate selectively, the process comprising successively:

the first step of applying the fluorine-containing epoxy resin composition of the present invention onto a substrate and drying the applied resin composition;

the second step of heating or irradiating with an activation energy ray the applied composition to effect polymerization and curing over the whole area thereof;

the third step of selectively irradiating the cured composition with a breaking activation energy ray to partly remove the cured composition; and if desired the fourth step of post-curing the remaining composition.

Yet still another object of the present invention is to provide an ink jet recording head having a discharge opening surface with a discharge opening for discharging a recording liquid therethrough, wherein at least a discharge opening formed portion of the discharge opening surface is coated with a cured film comprising the fluorine-containing epoxy resin composition of the present invention, and an ink jet recording apparatus comprising the ink jet recording head.

Since the resin composition of the present invention is of an epoxy resin type, it has an excellent adhesion to various members, can be cured at a relatively low temperature, and can provide a cured product having excellent physical properties as a structural member. Also, since it contains an epoxy compound having a perfluoro group at the terminal, the resin composition is improved greatly in resistance to water-soluble organic solvents, in particular, to polar organic solvents. Then, the action of a compatibilizing agent makes components compatible with one another, so that the scope of material constitution can be broadened.

The fluorine-containing epoxy resin composition of the present invention is useful as a material applied to places having opportunities of contact with solutions or materials containing components that may damage adhesion of water repellent materials, such as polar organic solvents. As a water-repellent material or water-repellent coating material applied to such places, the present resin composition is especially suited for water-repellent and ink-repellent treatment of discharge opening surfaces of ink jet recording heads.

In the ink jet recording apparatus of the present invention, the employment of selective surface modification utilizing photopolymerizability enables a highly precise treatment, and the cured coating constituted of specific materials can provide water-repellent or ink-repellent areas having superior solid strength and wear resistance.

DESCRIPTION OF THE PREFERRED EMBODIMENTS

Figure 1:
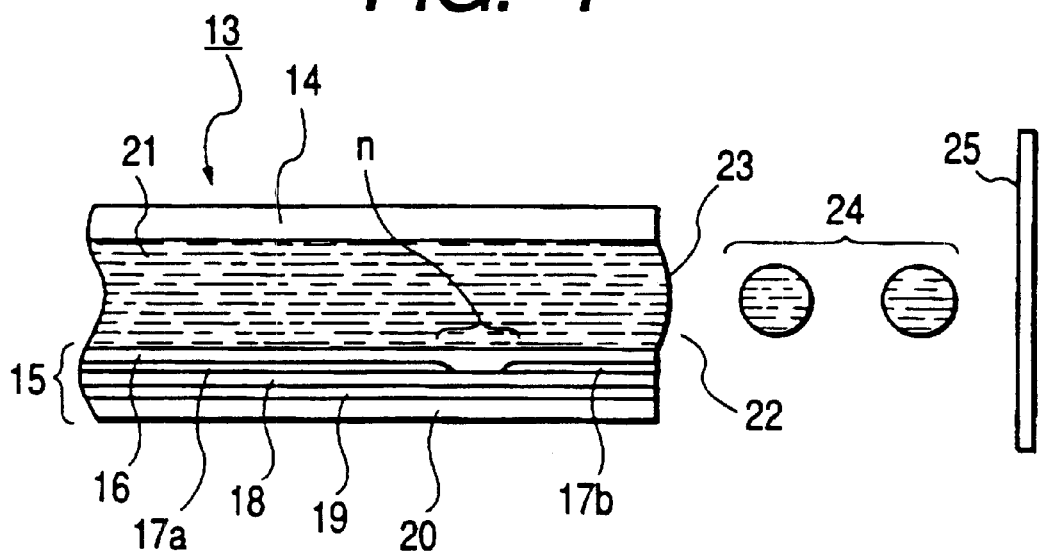
FIG. 1 is a cross-sectional view of the main part of an example of an ink jet recording head to which the present invention is applied.

The fluorine-containing epoxy resin composition of the present invention comprises a fluorine-containing epoxy resin having in one molecule at least one perfluoroalkyl group and at least two alicyclic epoxy groups. The perfluoroalkyl group is present on the relatively outer side of the molecule even when the epoxy group reacts, and hence fluorine atoms can be kept at a high density on the surface of resin. This is presumed to enable formation of a layer that exhibits water repellency, oil repellency and ink repellency on the surface while the inside remains a hard resin layer.

In the present invention, as the above fluorine-containing epoxy resin, at least one of epoxy compounds represented by the following Formulas (A-1) to (A-2) or epoxy polymers represented by the following Formulas (A-3) to (A-5) may preferably be used.

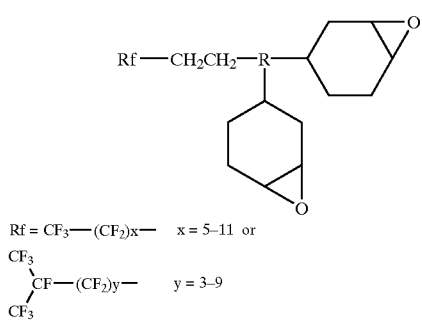

(A-1)

Rf = CF$_3$—(CF$_2$)$_x$—  x = 5–11 or
CF$_3$
 \
  CF—(CF$_2$)$_y$—  y = 3–9
 /
CF$_3$

In the above formula, R is an aliphatic residue for linking monomers each having an alicyclic epoxy group.

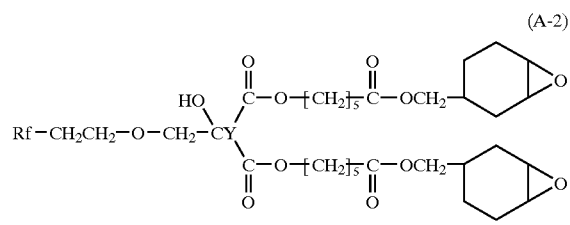

(A-2)

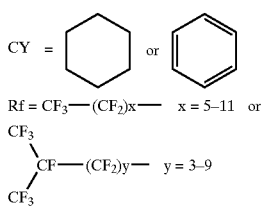

Rf = CF$_3$—(CF$_2$)$_x$—  x = 5–11 or
CF$_3$
 \
  CF—(CF$_2$)$_y$—  y = 3–9
 /
CF$_3$

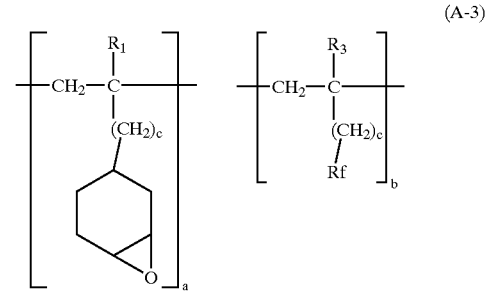

(A-3)

R$_1$, R$_3$ = H or CH$_3$  a = 2–50  b = 2–50
Rf = CF$_3$—(CF$_2$)$_x$—  x = 5–11 or  c = 0–3
CF$_3$
 \
  CF—(CF$_2$)$_y$—  y = 3–9
 /
CF$_3$

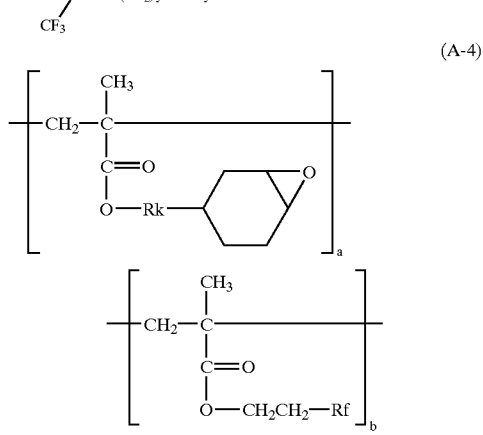

(A-4)

Rk = CH$_2$,
—(CH$_2$)$_5$—COO—$_p$CH$_2$—  p = 1–3 a = 2–50  b = 2–50
Rf = CF$_3$—(CF$_2$)$_x$—  x = 5–11 or
CF$_3$
 \
  CF—(CF$_2$)$_y$—  y = 3–9
 /
CF$_3$

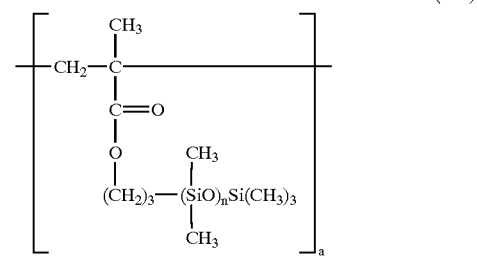

(A-5)

-continued

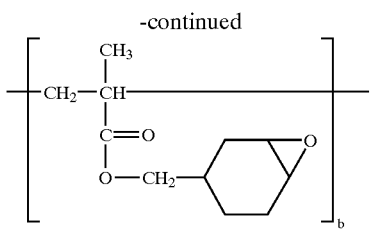

Rf = CF$_3$—(CF$_2$)x—  x = 5–11 or
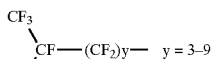
y = 3–9 a = 1–50   b = 2–100
c = 1–50   n = 2–100

Among the above, the epoxy polymer represented by the general formula (A-3) has a low degree of polymerization and no ester group. Therefore, a coating comprising this polymer is expected to be excellent in water resistance and hydrolysis property.

The epoxy polymer as a high polymer is used together with the epoxy compound to enhance the coating property of a composition formed therefrom and the drying property of the composition after solvent evaporation, and improve the workability of the dried coating. Namely, the epoxy compound functions as a binder. Accordingly, combination with the epoxy compound is preferable in execution of exposure operation in a pattern. In this time, the ratio of both may be suitably determined in consideration of their softening temperatures and glass transition temperatures, but the ratio by weight of the epoxy compound: the epoxy polymer is preferably in a range of 10:90 to 90:10.

As specific examples of the compound represented by the above Formula (A-1), it may include, e.g., the following.

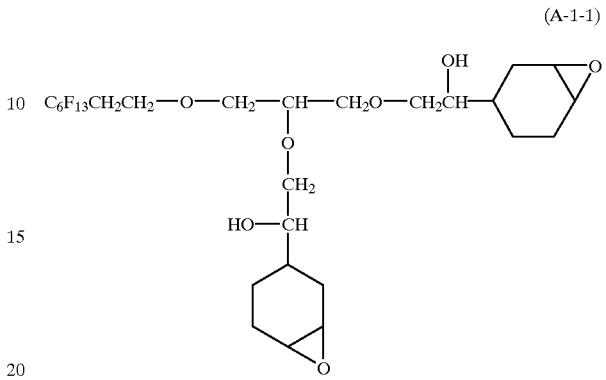

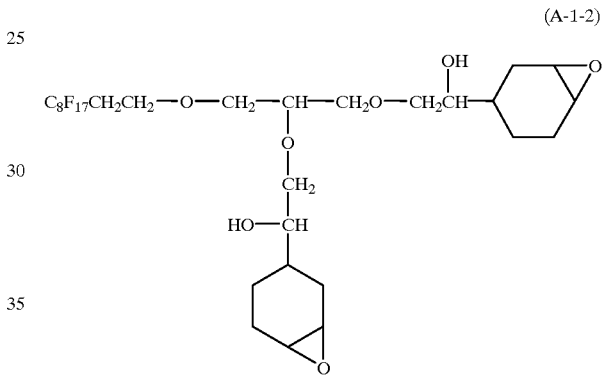

As specific examples of the compound represented by the above Formula (A-2), it may include, e.g., the following.

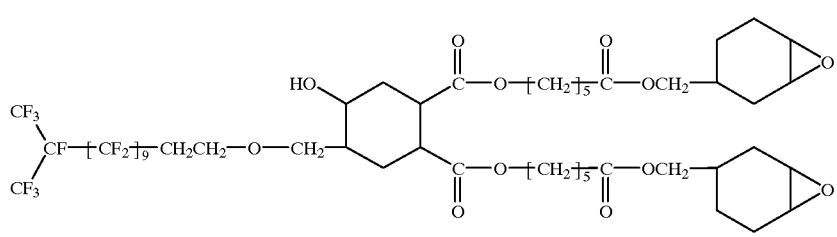

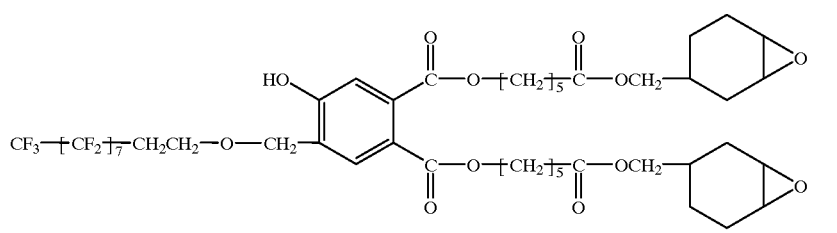

As specific examples of the compound represented by the above Formula (A-3), it may include, e.g., the following.

The vinyl polymer (A-3-1) having the number-average molecular weight of 6000 obtained by polymerizing 50% by weight of

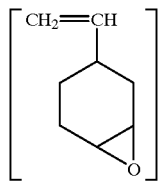

and 50% by weight of

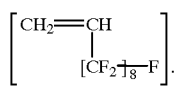

The vinyl polymer (A-3-2) having the number-average molecular weight of 8000 obtained by polymerizing 60% by weight of

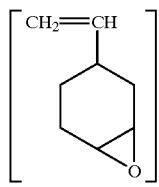

and 40% by weight of

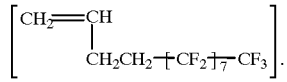

As specific examples of the compound represented by the above Formula (A-4), it may include, e.g., the following.

The acrylic polymer (A-4-1) having the number-average molecular weight of 4500 obtained by polymerizing 45% by weight of

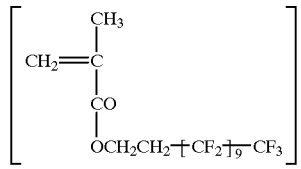

and 55% by weight of

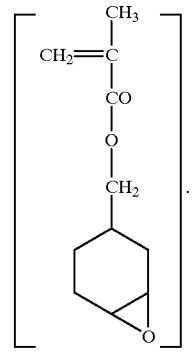

The acrylic polymer (A-4-2) having the number-average molecular weight of 10000 obtained by polymerizing 40% by weight of

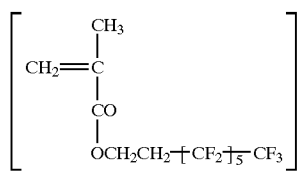

and 60% by weight of

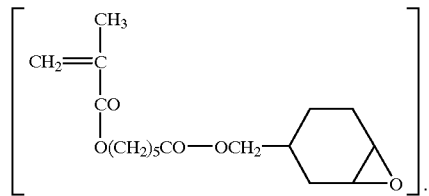

As specific examples of the compound represented by the above Formula (A-5), it may include, e.g., the following.

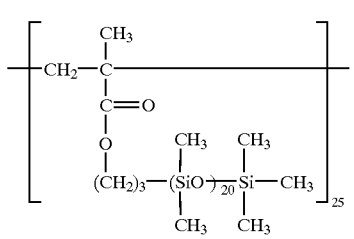

(A-5-1)

-continued

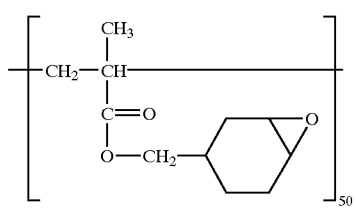

which enable especially low-temperature curing. Hence, the composition is suited for performing the surface treatment selectively by photolithography and also for making surface modification on substrates that are different to hold at a high temperature.

The cationic polymerization catalyst used in the resent invention may include bis(4-tert-butylphenyl)iodonium salts, and also OPTOMER SP-150 and OPTOMER SP-170 (available from Asahi Denka Kogyo K.K.), represented by the following structural formulas, any of which may preferably be used.

OPTOMER SP-150:

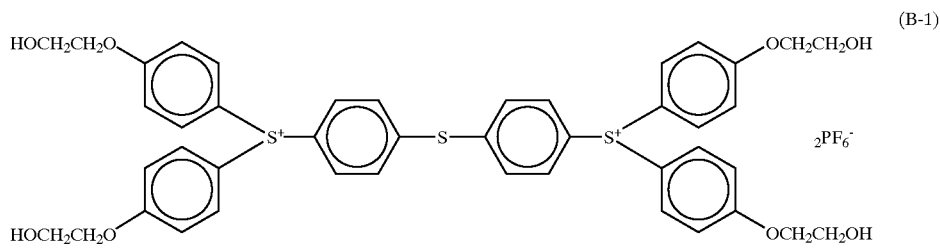

(B-1)

OPTOMER SP-170:

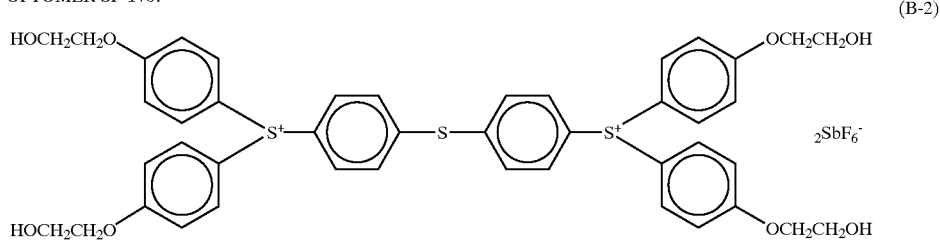

(B-2)

-continued

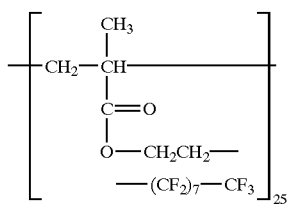

IRGACURE 261 (available from Ciba Specialty Corp.), represented by the following structural formula, may also used.

IRGACURE 261

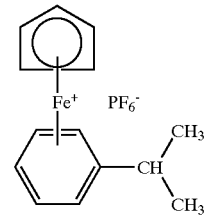

(B-3)

The epoxy resin composition of the present invention contains a cationic polymerization catalyst (a polymerization initiator) as a catalyst for curing the composition. Compounds used for such purpose may be selected from materials known as curing agents for epoxy resins. Since the composition of the present invention is an epoxy resin composition, an aromatic or aliphatic amine or an acid anhydride may be added to effect polymerization by heat curing. In the present invention, however, the composition is so designed that it may have a high reactivity to the onium salt of a Lewis acid activated by activation energy rays The fluorine-containing epoxy resin composition of the present invention may further be incorporated with, as a compatibilizing agent, at least one of compounds represented by the following Formulas (C-1) and (C-2).

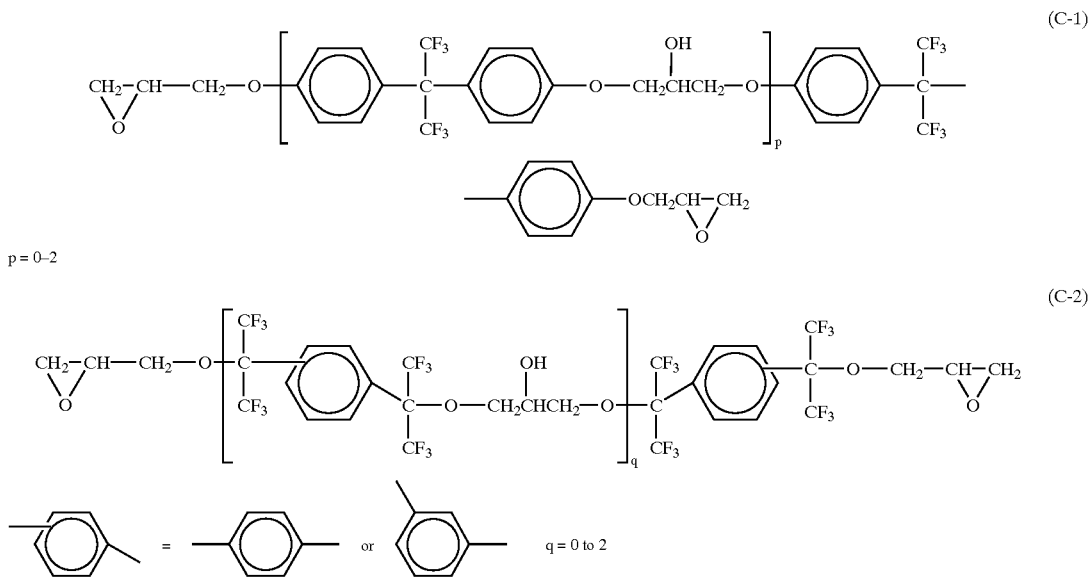

(C-1)

$p = 0–2$ (C-2)

$q = 0$ to $2$

As specific examples of the compatibilizing agent, it may include compounds represented by the following structural formulas.

A: the fluorine-containing epoxy resin;
B: the cationic polymerization catalyst; and optionally
C: the compatibilizing agent.

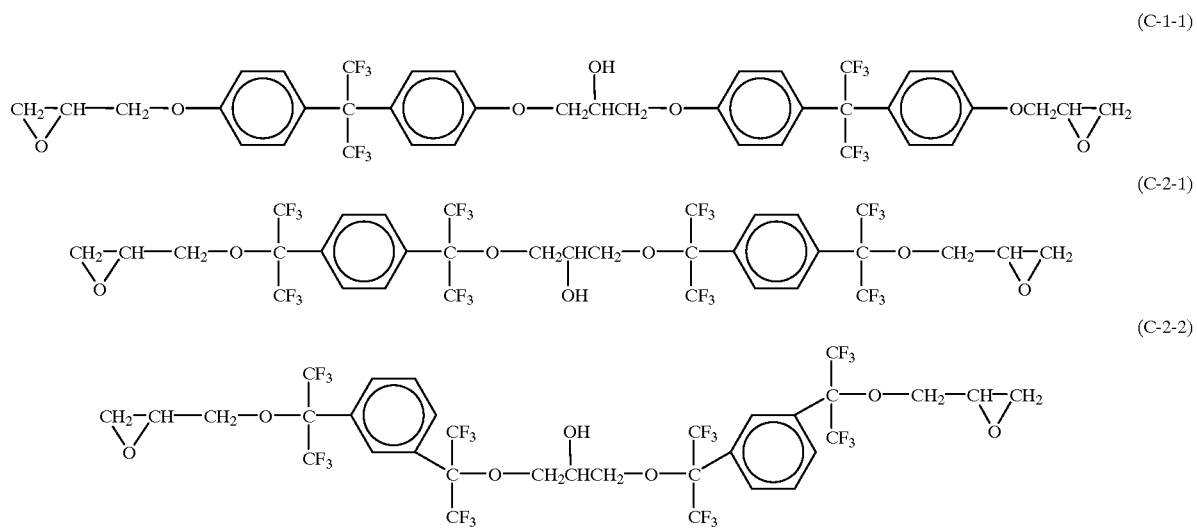

The above compatibilizing agent has fluorine atoms, but is constituted chiefly of fluoromethyl groups and has a small chain length. Hence, as a molecule, it has a small action of lowering surface energy and does not have any great water repellency and ink repellency. It, however, is effective for improving the compatibility of the fluorine-containing aromatic epoxy resin with the cationic polymerization catalyst. More specifically, instances where the compatibilizing agent is used in combination are instances where, because of a high polarity of the onium salt of a Lewis acid which is the cationic polymerization catalyst, it has a poor compatibility with the fluorine-containing aromatic epoxy resin, and any practical difficulty such as a difficulty in leveling performance at the time of coating must be overcome.

The epoxy resin composition of the present invention contains basically:

In the composition, these components A, B and C may preferably be in a mixing proportion described below.

The component B may be mixed in an amount ranging from 0.1 part by weight to 10 parts by weight based on 100 parts by weight of the total epoxy resin component (the component A when the component C is not used, and the total of the components A and B when the component C is used). The range of proportion depends on factors including layer thickness, required pattern precision, degree of cross-linking of polymerized coatings, stability of development in the case where developing is carried out, and rate of reaction in the case where only curing alone is carried out. Taking account of such factors, the component-B cationic polymerization catalyst may usually be used in an amount of from 0.1 to 7 parts by weight, and preferably from 0.3 to 5 parts by weight, based on 100 parts by weight of the total of the epoxy resin component.

In the case where the compatibilizing agent component C is used in combination, it is used within the range of component A:component C=100:10 to 100:100 (weight ratio). That is, the component A must be 50% by weight or more in the epoxy resin component.

The exemplary compositions of the present invention are shown below. The following ratios indicate weight ratio of solid content.

(Exemplary Composition 1): A-1-1:B-1=96:4
(Exemplary Composition 2): A-1-2:B-1=94:6
(Exemplary Composition 3): A-2-1:A-3-1:B-2=48:48:4
(Exemplary Composition 4): A-2-2:A-4-1:B-1=30:63:7
(Exemplary Composition 5): A-1-1:A-5-1:B-2=35:60:5
(Exemplary Composition 6): A-1-2:A-4-2:B-1:C-1 (p=)= 90:10:25:4
(Exemplary Composition 7): A-2-1:A-3-2:B-1:C-2 (q=)= 25:55:20:1
(Exemplary Composition 8): A-2-2:A-5-1:B-1:C-2 (q=)= 25:45:30:0.5
(Exemplary Composition 9): A-2-1:B-1=94:6
(Exemplary Composition 10): A-2-2:B-1=97:3
(Exemplary Composition 11): A-2-2:A-5-1:B-1:C-2-2= 25:45:10:20

An additional polymer may optionally be added to the fluorine-containing epoxy resin composition of the present invention. For example, a polymer that functions as a binder may be used, which also the functions to improve coating adaptability of the composition of the present invention and to improve drying performance after solvent evaporation to improve workability required as dried coatings. Use of such a binder material in combination is preferable when the composition of the present invention is exposed to light in a pattern to form a desired pattern form.

Binder polymers that can be added to the fluorine-containing epoxy resin composition of the present invention may include alicyclic epoxy resin oligomers, acrylic resins obtained by copolymerization of acrylic monomers having no fluorine atomic group but having an epoxy group in the side chain, vinyl polymers obtained by polymerization of vinyl monomers having an alicyclic hydrocarbon group having an epoxy group in the side chain, polyether polymers having an alicyclic hydrocarbon group having an epoxy group in the side chain (e.g., EHPE3150, available from Daicel Chemical Industries, Ltd.), which are most preferred as epoxy polymers also capable of participating in a cross-linking reaction by themselves. When polymers not having such an epoxy group are used, such polymers may be selected with respect to the adjustment of physical properties in accordance with the purpose for which they are used. Such materials may include polymeric compounds for general-purpose coating materials, as exemplified by bisphenol type epoxy resin polymers PKHC and PKHJ, available from Union Carbide, ethylene-vinyl acetate copolymers, phenol resins, polycarbonate resins, polyester resins, polyamide resins and soluble polyimide resins.

In the composition of the present invention, in the case where such an additional polymer is used in combination, the components A and C may be in a weight proportion of component A:component C=100:10 to 100:100 (weight ratio). The component B may be contained in an amount of from 0.1 to 10 parts by weight based on 100 parts by weight of the total composition containing the binder polymer.

With regard to a specific surface treatment process carried out using the composition in the present invention, the process is exemplified below. In the case where the composition is cured with activation energy radiation, as described previously, the cationic polymerization catalyst capable of releasing a Lewis acid by light is added as a catalyst when used. In the case where the composition is cured by heating, a Lewis acid such as a trifluoroboron amine catalyst may be added when used.

(Formation of Coatings)

The fluorine-containing epoxy resin composition of the present invention is dissolved in an organic solvent such as an aromatic type, aliphatic hydrocarbon type, ester type, ether type or fluorine type solvent. When the composition is coated in a small layer thickness of several $\mu$m, usual precision coating machines such as a roll coater, a spin coater and a spray coater may be used.

A first process for making the surface treatment in a pattern can be carried out by taking successively the first steps of coating the fluorine-containing epoxy resin composition of the present invention on a substrate (a treating object), followed by drying; the second step of exposing the coated composition to activation energy radiation in a pattern through a mask to cure the composition selectively; and the third step of dissolving and removing the coated composition at its areas unexposed to the activation energy radiation in the second step, by development making use of a developing solution. Basic steps are the same as those of photolithography, but it is necessary to select as the developing solution a solvent suited for the resin composition. As the developing solution, usable are aromatic hydrocarbons, ketones, esters, glycol ethers and mixtures of any of these. In order to make the reaction of the resin composition complete, the composition may be further heated or exposed to activation energy radiation after the development (fourth step).

A second process for making the surface treatment in a pattern can be carried out by taking successively the first steps of coating the fluorine-containing epoxy resin composition of the present invention on the substrate, followed by drying; the second step of heating or exposing to activation energy radiation the coated composition for accelerating its polymerization to cause it cure over the whole area; and the third step of exposing the cured composition to breaking activation energy radiation so as to remove it selectively at its desired areas.

In the second process, too, in order to make the reaction complete, the composition may preferably be heated or exposed to polymerizing activation energy radiation at any stage (fourth step).

As the activation energy radiation to accelerate the polymerization, ultraviolet radiation rich in light with wavelength of 250 to 480 nm may be used. As the breaking activation energy radiation, light with wavelength of 210 nm or less or excimer laser may be used.

Thus, the fluorine-containing epoxy resin composition of the present invention is suited as a water-repellent material or water-repellent coating material applied to places having opportunities of contact with solutions or materials containing components that may damage adhesion of water repellent materials, such as polar organic solvents, and also can suitably be used in the water-repellent and ink-repellent treatment of discharge opening surfaces of the ink jet recording head.

According to the surface modification process of the present invention, the water-repellent and ink-repellent treatment can be made in a good adhesion to the substrate and a good surface hardness. Hence, modification promising a good durability can be made.

As its application to the ink jet recording head, the discharge opening surfaces are treated with the composition of the present invention, whereby good-release surfaces can be formed which may make the ink not adhere strongly thereto and make it ready to be wiped off by cleaning. In most cleaning mechanisms mounted on ink jet recording heads, the discharge openings are, e.g., wiped with a rubber blade, sucked with a pump, or empty-discharged at a position other than recording paper. Whichever methods are used, however, not all the ink turns into droplets when ink columns withdrawn by discharge pressure are brought into droplets. Hence, it is impossible to completely prevent fine droplets of any excess ink from adhering to the circumference of the discharge opening. Accordingly, if these can drop spontaneously and be sucked back to the insides of the discharge openings to become removed with ease, they no longer affect the discharge of ink.

The fluorine-containing epoxy resin composition of the present invention can be cured at a relatively low temperature, and can provide a cured product having superior water and oil repellency, adhesion, chemical resistance and rub resistance.

Figure 2:
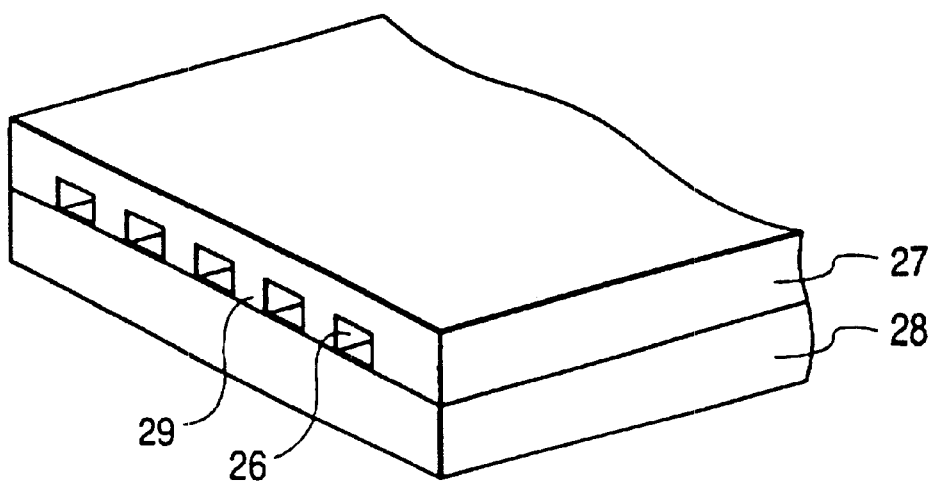
FIG. 2 is a perspective view of the main part of the ink jet recording head shown in FIG. 1.

FIGS. 1 and 2 show the main part of an example of an ink jet recording head to which the fluorine-containing epoxy resin composition of the present invention is applicable. FIG. 1 is a cross-sectional view along an ink channel, and FIG. 2 is a perspective view.

This recording head, 13, is constituted of a substrate 15 provided with a discharge energy generating device, and a member 14 which is so provided as to form at least a channel by molding a cured product of a thermosetting resin composition and/or an activation energy radiation curing resin composition in a predetermined pattern and is joined superposingly to the substrate. The substrate 15 is constituted of a base member 20 comprised of a material having good heat dissipation properties, such as alumina, and superposed on its surface a heat accumulating layer 19, a heating resistor layer 18, electrodes 17a and 17b formed of aluminum or the like, and a protective layer 16 in this order so that, upon electrification of the electrodes 17a and 17b, the discharge energy generating device formed at a part (the part present in the region shown by letter symbol n), where the electrodes are not superposed, of the heating resistor layer 18 can generate heat to cause heat energy to act on a recording liquid positioned above that part.

In recording, the recording liquid 21 fills the channel of the member 14 up to its discharge opening 22, which is a minute opening of the channel, and forms a meniscus 23 there. In this state, upon electrification of the electrodes 17a and 17b in accordance with recording signals, heat is generated abruptly at the region denoted by n, so that bubbles are generated by film boiling in the recording liquid 21 coming into contact with this region. By the pressure thus produced, the recording liquid 21 is discharged from the discharge opening 22 in the form of fine droplets onto a recording medium 25.

In the ink jet recording head of the present invention, a cured product of the fluorine-containing epoxy resin composition is applied as a water-repellent and ink-repellent agent at least at the opening portion of a discharge opening surface 29 so that the droplets can be prevented from adhering to this surface and causing aberration of the direction of discharge of the droplets. Moreover, the cured product of the fluorine-containing epoxy resin composition not only has an excellent adhesion, but also its water repellency and adhesion is by no means damaged by any organic solvent, in particular, a polar organic solvent, even when it is contained in the recording liquid.

In FIG. 2, reference numeral 26 denotes a discharge opening; 27, a member in which liquid flow paths have been formed; 28, a substrate on which the discharge energy generating device has been provided; and 29, the discharge opening surface.

Figure 3:
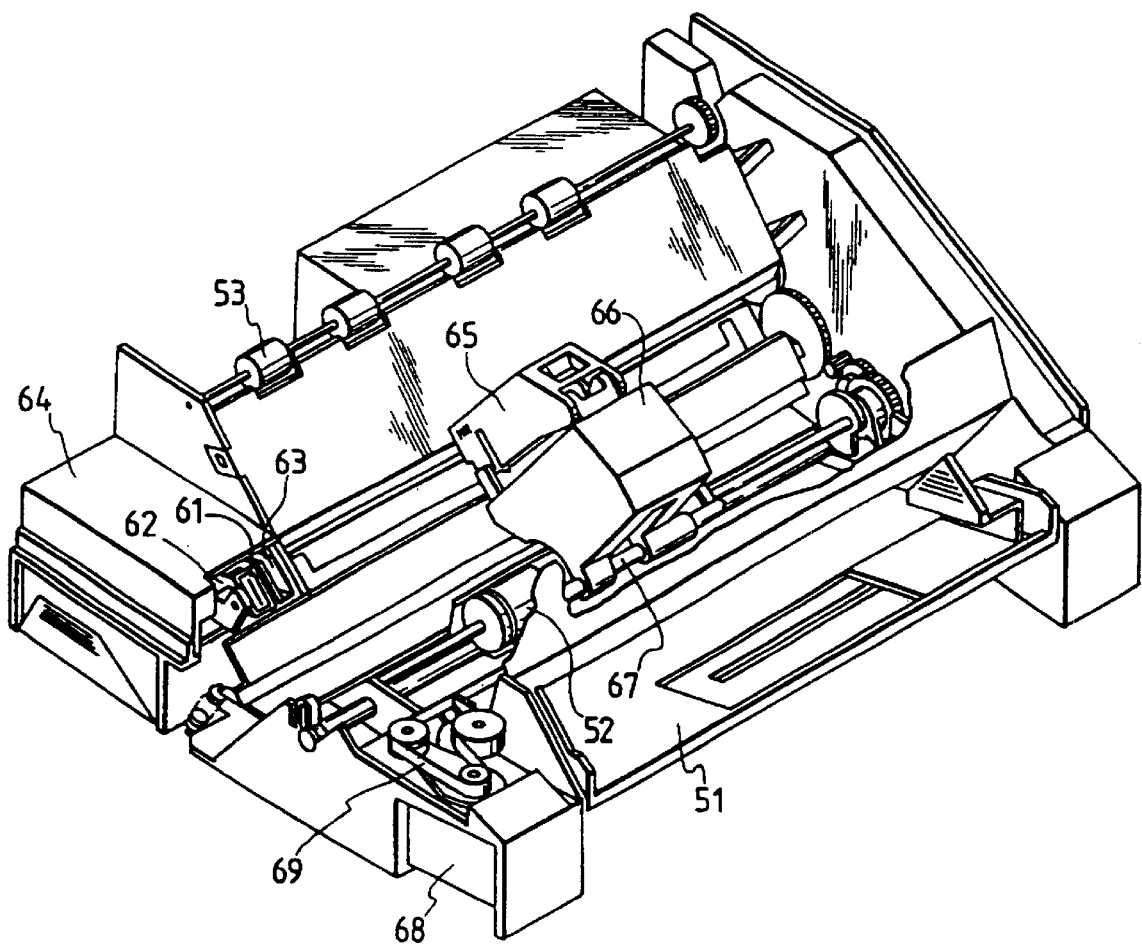
FIG. 3 illustrates an example of an ink jet recording apparatus incorporating the ink jet recording head shown in FIG. 1.

FIG. 3 shows an example of an ink jet recording apparatus in which a multi-head like the one shown in FIG. 2 has been incorporated. In FIG. 3, reference numeral 61 denotes a blade serving as a wiping member in the form of a cantilever, one end of which is a stationary end retained by a blade-retaining member. The blade 61 is provided at the position adjacent to the region in which a recording head makes a record. In the present example, the blade is retained in such a form that it projects to the course through which the recording head is moved. Reference numeral 62 denotes a cap, which is provided at the home position adjacent to the blade 61, and is so constituted that it moves in the direction perpendicular to the direction in which the recording head is moved and comes into contact with the discharge opening surface to carry out capping. Reference numeral 63 denotes an ink absorber provided adjoiningly to the blade 61, and, similar to the blade 61, is retained in such a form that it projects to the course through which the recording head is moved. The above blade 61, cap 62 and absorber 63 constitute a discharge restoration section 64, where the blade 61 and the absorber 63 remove the water, dust and so forth from the ink discharge opening surface.

Reference numeral 65 denotes a recording head which performs ink jet recording, and is, e.g., as shown in FIGS. 1 and 2, so constituted as to discharge the recording liquid such as ink by heat energy. Reference numeral 66 denotes a carriage on which the recording head 65 is mounted so that the recording head 65 can be moved. The carriage 66 is associated slidably with 3 guide shaft 67. Part of the carriage 66 is connected (not shown) with a belt 69 driven by a motor 68. Thus, the carriage 66 can be moved along the guide 67, that is, the recording head 65 can be moved to a recording region in which the recording head 65 makes a record and to a region adjacent thereto.

Reference numeral 51 denotes a paper feeding part from which recording mediums are inserted, and 52, a paper feed roller driven by a motor (not shown). With such construction, the recording medium is fed to the position opposite to the discharge opening surface of the recording head, and, with progress of recording, outputted from a paper output section provided with a paper output roller 53.

In the above constitution, the cap 62 of the head restoration section 64 is receded from the moving course of the recording head 65 when the recording head 65 is returned to its home position after completion of recording, and the blade 61 stands projected to the moving course. As a result, the discharge opening surface of the recording head 65 is wiped. When the cap 62 comes into contact with the discharge opening surface of the recording head 65 to carry out capping, the cap 62 is moved in such a way that it projects to the moving course of the recording head.

When the recording head 65 is moved from its home position to the position at which recording is started, the cap 62 and the blade 61 are at the same position as the position where the discharge opening surface is wiped. As the result, the discharge opening surface of the recording head 65 is wiped also at the time of this movement.

The above movement of the recording head to its home position is made not only at the time of the completion of recording or restoration of discharge, but also when the recording head is moved between recording regions for the purpose of recording, during which it is moved to the home position adjacent to each recording region at given intervals, where the discharge opening surface is wiped in accordance with this movement.

In the ink jet recording apparatus, in the case of color recording, it can be performed using a recording head comprising one head in which discharge openings for cyan, magenta, yellow and black inks are arranged. Alternatively, recording heads for the respective colors may be arranged independently in parallel.

In these cases, the respective color inks may be discharged from one discharge opening, or the respective color inks may be discharged simultaneously from a plurality of discharge openings so that droplets of two or more identical colors may adhere simultaneously to the recording medium.

The recording head in the present invention is surface-treated with the ink-repellent treating material as described above and has chemical properties as demonstrated in the following Examples. Hence, the ink jet recording ink may adhere less thereto, and any ink that has adhered can be removed very readily by the cleaning wiper blade. This brings about a dramatic improvement in durability for printing.

EXAMPLES

The present invention will be described below in greater detail by giving Examples.

Examples 1 to 11

Solutions of 30% to 40% by weight of Exemplary Compositions 1 to 11 described previously, in 1:1 mixed solvents of diethylene glycol dimethyl ether and toluene were prepared. These were each coated on a silicon wafer substrate having a thermal oxide film of 5 $\mu$m thick, in a wet-coating thickness of 1 $\mu$m to 3 $\mu$m by means of a spin coater. Subsequently, this substrate was dried on a 110° C. hot plate for 5 minutes to remove the solvent. The substrate thus treated was exposed to ultraviolet radiation of 2 J/cm$^2$ in integral quantity by means of an ultraviolet irradiator making use of high-pressure mercury lamps, followed by heating in a 150° C. furnace for 15 minutes to complete the curing reaction.

Using the substrates thus prepared, the following measurement was made.

T1: Measurement of Contact Angle

Using each of pure water, an aqueous 10% by weight oleic acid solution, an aqueous 20% by weight glycerol solution and an aqueous 1% by weight surface-active agent solution [polyoxyethylene nonylphenyl ether; HLB (hydrophobic-lipophobic-balance): 10], static contact angles were measured at room temperature.

T2: Measurement of Contact Angle After Immersion in Aqueous Dye Solution

In an aqueous 3% by weight solution of water-soluble dye Direct Black 168 (pH: 10.3), the substrate, having been subjected to ink-repellent treatment, was immersed at 60° C. for 7 days. Thereafter, this substrate was washed with pure water, followed by drying, and contact angles to ink were again measured.

Figure 4A:
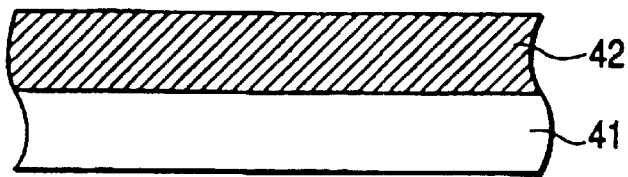
FIGS. 4A, 4B, 4C, 4D and 4E illustrate steps for producing an ink jet recording head in the Examples of the present invention.
Figure 4B:
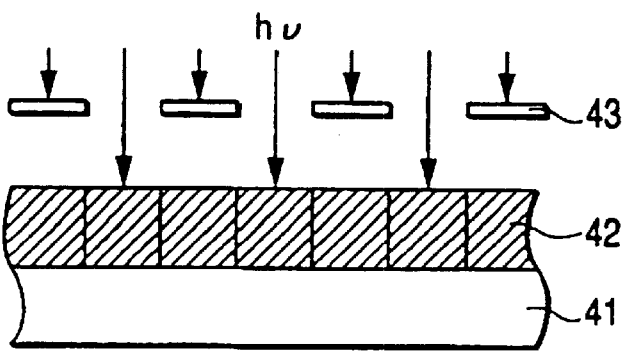
Figure 4C:
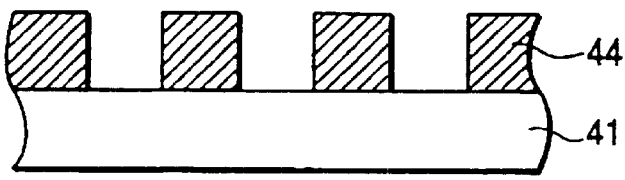
Figure 4D:
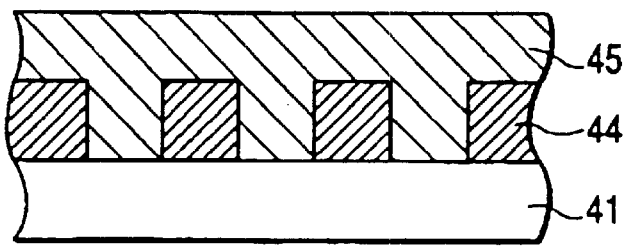

T3:

As shown in FIG. 4A, on a substrate 41 provided beforehand with the discharge energy generating device, a positive photoresist 42 (PMER AR-900, available from Tokyo Ohka Kogyo Co., Ltd.) was spin-coated in a thickness of 30 $\mu$m, followed by prebaking at 90° C. for 40 minutes in an oven to form a resist layer. Thereafter, as shown in FIGS. 4B and 4C, the resist layer was patterned using a mask 43 to obtain a resist pattern 44. On the resist pattern 44, as shown in FIG. 4D, a material for forming a liquid flow path prepared by mixing a chief material composed as shown below and a curing agent (a modified aliphatic amine FUJICURE FXK830, available from Fuji Kasei Kogyo Co., Ltd.) in a proportion of chief material/curing agent=100/50 (weight ratio) was laminated in a layer thickness of 100 $\mu$m.

TABLE 1

| Chief-Material Constitution of Two-part Epoxy Resin Composition | |
|---|---|
| Composition | Parts* |
| EPIKOTE 828 (available from Yuka Shell Epoxy K.K.) | 75 |
| 1,3-Bis(3-glycidoxypropyl)tetramethyldisiloxane | 25 |
| NUC silane coupling agent A-187 (available from Nippon Unicar Co., Ltd.) | 5 |

*by weight

Figure 4E:
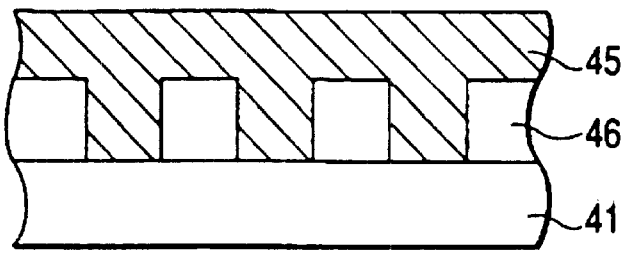

After a layer of material for forming a liquid flow path 45 was laminated, it was left at 25° C. for 24 hours, followed by further heat curing at 100° C. for 2 hours. Next, the laminate thus obtained was immersed in an aqueous 3% by weight sodium hydroxide solution to dissolve and remove the resist pattern 44, followed by washing and then drying to form liquid flow paths 46 (FIG. 4E). Thus, an ink jet recording head was obtained.

On the discharge opening surfaces of ink jet recording heads obtained in this way, the fluorine-containing epoxy resin compositions of Examples 1 to 11 were coated individually, which were then cured by exposure to ultraviolet radiation of 8 J/cm$^2$ and by heating at 150° C. for 1 hour.

The ink jet recording heads thus treated were each further wired electrically in a given form and incorporated in a printer to make a long-term print durability test by the use of an ink jet recording ink comprised of pure water/glycerol/Food Black 2 (a water-soluble black dye)/N-methylpyrrolidone=70/15/3/12 (parts by weight).

In the print durability test, a pattern for evaluating characters and ink-droplet impact precision was printed on 100 sheets, and evaluation was made on any dot disorder on the last print sample. Results obtained are designated as T3-1.
Evaluated as A
  No dot positional disorder is seen, and characters are sharp.
Evaluated as B
  Dot positional disorder is seen a little, but affects character quality level only slightly.
Evaluated as C
  Dot positional disorder is fairly seen, and also characters have a low sharpness.
Evaluated as D
  Dot break-off has occurred and character quality level has lowered greatly.

The surfaces of the ink jet recording heads used were also observed to evaluate ink adhesion quantity. Results obtained are designated as T3-2.
Evaluated as A
  Ink drops are little seen a little on the discharge opening surface.
Evaluated as B
  Small ink drops are seen on the discharge opening surface.
Evaluated as C
  Large ink drops are seen in the vicinity of discharge openings.

The results of the foregoing are summarized in Table 2 below.

Comparative Example 1

The fluorine-containing epoxy resin composition of the present invention was replaced with a fluororesin coating material (FLUORAD FC-722, available from Sumitomo 3M Limited), and curing conditions were changed to drying at 100° C. for 30 minutes. Evaluation was made on the above T1 to T3 in the same manner as in Examples 1 to 11.

Comparative Example 2

Test substrates and recording heads were produced under the same coating and curing conditions as in Examples 1 to 11 except for using the following composition making use of fluorine-containing epoxy resins, compounds represented by the following structural formulas D-1 and D-2.

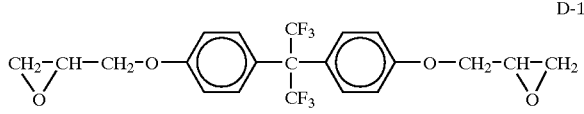
D-1

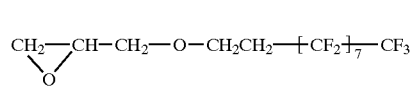
D-2

| Composition: | (parts by weight) |
|---|---|
| D-1 | 14 |
| D-2 | 5 |
| B-3 | 1 |
| Propylene carbonate | 10 |
| Xylene | 40 |
| Methyl isobutyl ketone | 30 |

TABLE 2

Evaluation results:

| Coating thickness ($\mu$m) | T1 Contact angles | | | | T2 (Immersion test) Contact angles | | T3 (Long-term print durability test) | |
|---|---|---|---|---|---|---|---|---|
| | Pure water (°) | Oleic acid (°) | Glycerol (°) | Surfactant (°) | Before (°) | After (°) | T3-1 | T3-2 |

Example:

| | | | | | | | | | |
|---|---|---|---|---|---|---|---|---|---|
| 1 | 1.2 | 95 | 83 | 95 | 88 | 96 | 87 | A | A |
| 2 | 0.9 | 100 | 88 | 100 | 85 | 102 | 89 | A | A |
| 3 | 1.0 | 103 | 92 | 105 | 86 | 105 | 85 | B | A |
| 4 | 1.3 | 93 | 78 | 94 | 86 | 90 | 83 | A | B |
| 5 | 1.1 | 97 | 86 | 101 | 90 | 98 | 86 | A | A |
| 6 | 1.8 | 92 | 80 | 95 | 84 | 92 | 81 | B | B |
| 7 | 1.5 | 100 | 87 | 102 | 92 | 95 | 88 | A | A |
| 8 | 2.0 | 103 | 90 | 97 | 92 | 96 | 87 | A | B |
| 9 | 1.2 | 101 | 90 | 98 | 90 | 103 | 90 | A | A |
| 10 | 1.7 | 95 | 80 | 93 | 88 | 97 | 86 | A | B |
| 11 | 1.2 | 96 | 84 | 94 | 89 | 97 | 86 | A | A |

TABLE 2-continued

Evaluation results:

| Coating thickness ($\mu$m) | T1 Contact angles | | | | T2 (Immersion test) Contact angles | | T3 (Long-term print durability test) | |
|---|---|---|---|---|---|---|---|---|
| | Pure water (°) | Oleic acid (°) | Glycerol (°) | Surfactant (°) | Before (°) | After (°) | T3-1 | T3-2 |

Comparative Example:

| 1 | 2.4 | 90 | 72 | 90 | 85 | 90 | 74 | C | C |
|---|---|---|---|---|---|---|---|---|---|
| 2 | 1.7 | 93 | 78 | 93 | 83 | 88 | 73 | C | C |

As can be seen from the foregoing, the coatings formed of the fluorine-containing epoxy resin composition of the present invention have large contact angles and also can maintain such angles well. Also, even when inks come in contact with them over a long period of time, the ink does not adhere to the recording head surface, so that a good ink-droplet impact precision for dots can be achieved and print quality level can be maintained for a long time.

Example 12

The compositions of Examples 1, 3, 6 and 11 were coated on molded sheets of polyether sulfone by a spin coater in a layer thickness of about 2 $\mu$m each as the thickness after solvent evaporation. The substrates thus coated were exposed to light of 10 J/cm² in total from high-pressure mercury lamps to effect polymerization. Next, the substrates thus treated were exposed to light from above the coatings, the light being of an excimer laser with a wavelength of 195 nm and converged to a beam diameter of 5 $\mu$m, thus openings for discharge openings were formed. The openings were formed well, and were in a processed state with less decomposition residue at the edge areas. Thus, it can be seen that the composition of the present invention has a superior suitability also to ultraviolet laser processing.

As described above, the fluorine-containing epoxy resin composition of the present invention is understood to be curable at a low temperature, to have so good an adhesion as to enable formation of coatings with the desired pattern form, and to enable surface modification treatment which imparts a good water repellency. Accordingly, the present invention can provide an ink jet recording apparatus which is provided with an ink jet recording head having a good ink repellency at discharge openings and can perform highly precise printing.

What is claimed is:

1. A fluorine-containing epoxy resin composition comprising:

an epoxy compound represented by the following Formula (A-1):

(A-1)

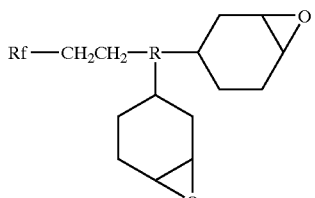

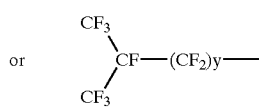

x = 5–11 or

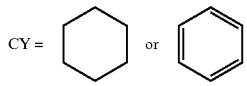

y = 3–9 wherein R is an aliphatic residue for linking monomers each having an alicyclic epoxy group, the aliphatic residue having a main chain consisting of carbon and oxygen atoms, and a cationic polymerization catalyst.

2. A fluorine-containing epoxy resin composition comprising:

an epoxy compound represented by the following Formula (A-2):

(A-2)

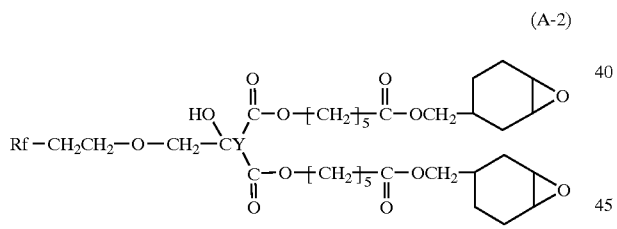

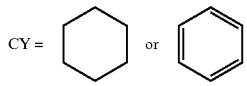

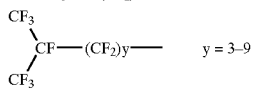

a cationic polymerization catalyst.

3. A fluorine-containing epoxy resin having in one molecule at least one perfluoroalkyl group having 6 to 12 carbon atoms and at least two alicyclic epoxy groups, and a cationic polymerization catalyst, wherein the resin comprises a monomer unit having a C—C bond, the C—C bond constituting the main chain of the resin.

4. The fluorine-containing epoxy resin composition according to claim 3, wherein the fluorine-containing epoxy resin is an epoxy polymer represented by the following Formula (A-3):

(A-3)

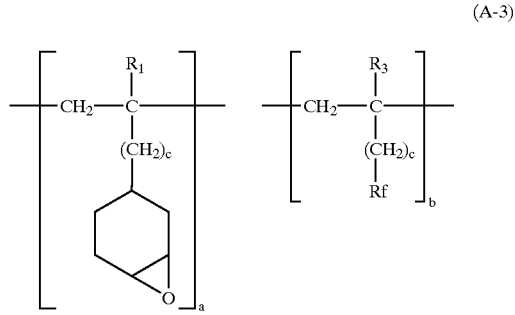

$R_1$, $R_3$ = H or $CH_3$
a = 2–50
b = 2–50
c = 0–3
Rf = $CF_3$—$(CF_2)_x$—   x = 5–11   or

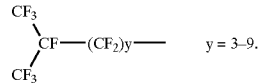   y = 3–9.

5. The fluorine-containing epoxy resin composition according to claim 3, wherein the fluorine-containing epoxy resin is an epoxy polymer represented by the following Formula (A-4):

(A-4)

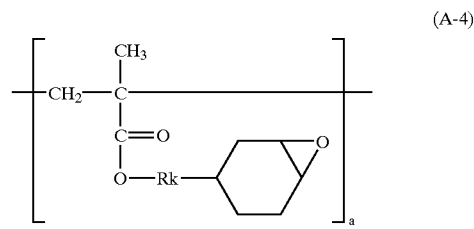

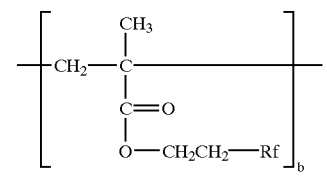

Rk = $CH_2$,  —$\mathrm{[(CH_2)_5—COO\,]_p}$—$CH_2$—   p = 1–3
a = 2–50
b = 2–50
Rf = $CF_3$—$(CF_2)_x$—   x = 5–1   or

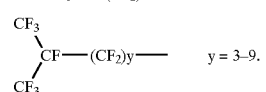   y = 3–9.

6. The fluorine-containing epoxy resin composition according to claim 3, wherein the fluorine-containing epoxy resin is an epoxy polymer represented by the following Formula (A-5):

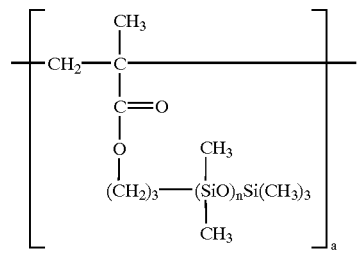
(A-4)

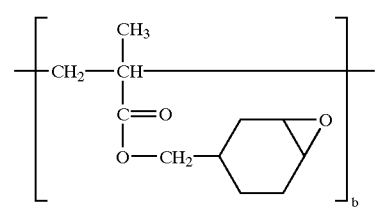

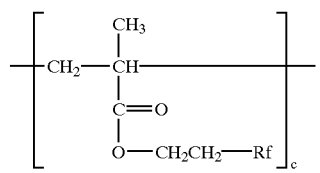

$Rf = CF_3-(CF_2)_x-$  $x = 5-11$ or $\begin{array}{c} CF_3 \\ CF-(CF_2)_y- \\ CF_3 \end{array}$  $y = 3-9$ $a = 1-50$  $b = 2-100$
$c = 1-50$  $n = 2-100$.

7. A fluorine-containing epoxy resin composition comprising:

a fluorine-containing epoxy resin having in one molecule at least one perfluoroalkyl group having 6 to 12 carbon atoms and at least two alicyclic epoxy groups, and a cationic polymerization catalyst, wherein the resin composition further comprises, as a compatibilizing agent, at least one of compounds represented by the following Formulas (C-1) and (C-2):

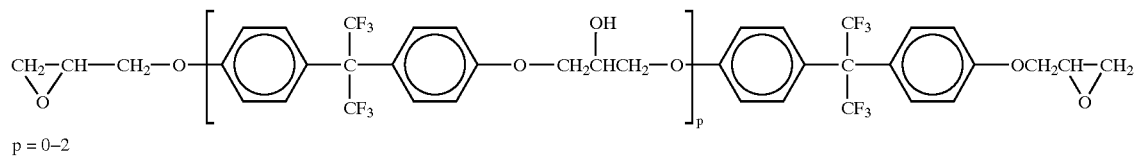
(C-1)

$p = 0-2$

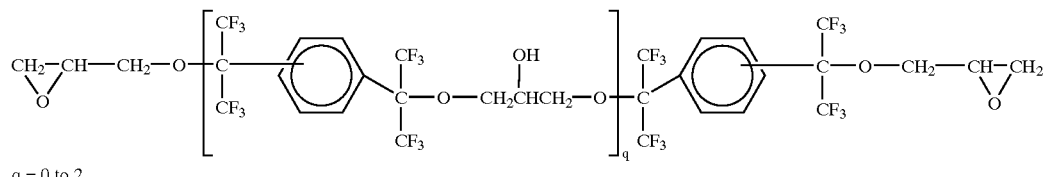
(C-2)

$q = 0$ to $2$

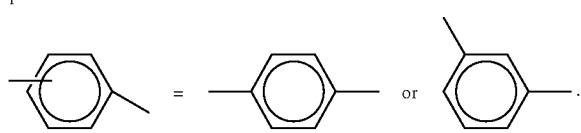

8. A surface treatment process for treating a surface of a substrate selectively, which comprises successively:
   a first step of applying the fluorine-containing epoxy resin composition according to any one of claims 1 to 3 and 7 onto a substrate and drying the applied resin composition;
   a second step of irradiating the applied composition with activation energy radiation in a pattern through a mask;
   a third step of dissolving and removing a part of the applied composition not irradiated with the activation energy radiation, by use of a liquid capable of dissolving the uncured composition; and if desired
   a fourth step of post-curing the remaining composition.

9. A surface treatment process for treating a surface of a substrate selectively, which comprises successively:
   a first step of applying the fluorine-containing epoxy resin composition according to any one of claims 1 to 3 and 7 onto a substrate and drying the applied resin composition;
   a second step of heating or irradiating with activation energy radiation the applied composition to effect polymerization and curing over a whole area thereof;
   a third step of selectively irradiating the cured composition with breaking activation energy radiation to partly remove the cured composition; and if desired
   a fourth step of post-curing the remaining composition.

10. An ink jet recording head having a discharge opening surface with a discharge opening for discharging a recording liquid therethrough, wherein at least a discharge opening formed portion of the discharge opening surface is coated with a cured film comprising the fluorine-containing epoxy resin composition as set forth in any one of claims 1 to 3 and 7.

11. An ink jet recording apparatus comprising the ink jet recording head as set forth in claim 10.

* * * * *

UNITED STATES PATENT AND TRADEMARK OFFICE
CERTIFICATE OF CORRECTION

PATENT NO.    : 6,472,129 B2
DATED         : October 29, 2002
INVENTOR(S)   : Hiromichi Noguchi et al.

It is certified that error appears in the above-identified patent and that said Letters Patent is hereby corrected as shown below:

Column 1,
Lines 48 and 53, "surface treatment of" should read -- surface-treat --.

Column 2,
Line 15, "performances" should read -- performance characteristics --.
Line 29, "a ink" should read -- an ink --.
Line 33, "of pH" should read -- pH --.

Column 14,
Line 4, "different" should read -- difficult --.
Line 6, "resent" should read -- present --.
Line 42, "used." should read -- be used. --.

Column 17,
Line 30, "the" should be deleted.

Column 20,
Line 34, "with 3" should read -- with a --.

Column 25,
Line 60, "a cationic" should read -- and a cationic --.

Column 27,
Line 10, "(A-4)" should read -- (A-5) --.

Signed and Sealed this

Twenty-fourth Day of June, 2003

JAMES E. ROGAN
*Director of the United States Patent and Trademark Office*

EX PARTE REEXAMINATION CERTIFICATE (6074th)
United States Patent
Noguchi et al.

(10) Number: US 6,472,129 C1
(45) Certificate Issued: Jan. 1, 2008

(54) FLOURINE-CONTAINING EPOXY RESIN COMPOSITION, AND SURFACE MODIFICATION PROCESS, INK JET RECORDING HEAD AND INK JET RECORDING APPARATUS MAKING USE OF THE SAME

(75) Inventors: Hiromichi Noguchi, Hachioji (JP); Akihiko Shimomura, Yokohama (JP); Isao Imamura, Kawasaki (JP); Tamaki Sato, Kawasaki (JP)

(73) Assignee: Canon Kabushiki Kaisha, Ohta-ku, Tokyo (JP)

Reexamination Request:
No. 90/008,144, Aug. 3, 2006

Reexamination Certificate for:
Patent No.: 6,472,129
Issued: Oct. 29, 2002
Appl. No.: 09/263,083
Filed: Mar. 8, 1999

Certificate of Correction issued Jun. 24, 2003.

(30) Foreign Application Priority Data

Mar. 10, 1998 (JP) .......................... 10-057638

(51) Int. Cl.
*C08G 59/32* (2006.01)
*C08G 59/30* (2006.01)
*C08G 59/00* (2006.01)
*B41J 2/16* (2006.01)

(52) U.S. Cl. .................. 430/326; 347/45; 430/324; 430/328; 430/329; 528/403

(58) Field of Classification Search ............... None
See application file for complete search history.

(56) References Cited

U.S. PATENT DOCUMENTS

| | | | |
|---|---|---|---|
| 3,132,121 A | 5/1964 | Pascal | 260/80.5 |
| 3,355,415 A * | 11/1967 | Worrall | 524/562 |
| 4,980,443 A | 12/1990 | Kendziorski et al. | 528/31 |
| 5,043,747 A | 8/1991 | Ebisawa et al. | 346/140 R |
| 5,178,959 A | 1/1993 | Eckberg et al. | 428/447 |
| 5,476,748 A | 12/1995 | Steinmann et al. | 430/269 |
| 5,800,965 A * | 9/1998 | Tsuji et al. | 430/287.1 |
| 6,344,526 B1 | 2/2002 | Noguchi et al. | 525/527 |
| 6,448,346 B1 | 9/2002 | Noguchi et al. | 525/527 |

FOREIGN PATENT DOCUMENTS

| | | | |
|---|---|---|---|
| EP | 388979 A2 * | 9/1990 | |
| EP | 572179 A2 * | 12/1993 | |
| EP | 779337 A1 * | 6/1997 | |
| JP | 54-89804 A * | 7/1979 | |
| JP | 1-215812 A * | 8/1989 | |
| JP | 2-39944 A * | 2/1990 | |
| JP | 2-153930 A * | 6/1990 | |
| JP | 3-7781 A * | 1/1991 | |
| JP | 4-68006 A * | 3/1992 | |
| JP | 4-236212 A | 8/1992 | |
| JP | 6-328698 A * | 11/1994 | |
| JP | 11-189622 A * | 7/1999 | |

OTHER PUBLICATIONS

Odian, Principles of Polymerization, Second Edition, (1981), pp. 179 and 194–195.*
Patent Abstracts of Japan, vol. 016, No. 098 (C–0918), Mar. 11, 1992, with respect to JP 03–277676 of Dec. 9, 1991.*
T. Maruno, et al. "Synthesis and Properties of a Novel Fluorine–Containing Alicyclic Diepoxide", Macromolecules, vol. 29, No. 6, Mar. 11, 1996, pp. 2006–2010.*
Mar. 18, 2002 European Search Report in European Patent Appl. No. 99104672.*
English–language translation of JP–A 4–236212, Aug. 25, 1992.

* cited by examiner

*Primary Examiner*—Alan Diamond

(57) ABSTRACT

The fluorine-containing epoxy resin composition of the present invention comprises a fluorine-containing epoxy resin having in one molecule at least one perfluoroalkyl group having 6 to 12 carbon atoms and at least two alicyclic epoxy groups, and a cationic polymerization catalyst.

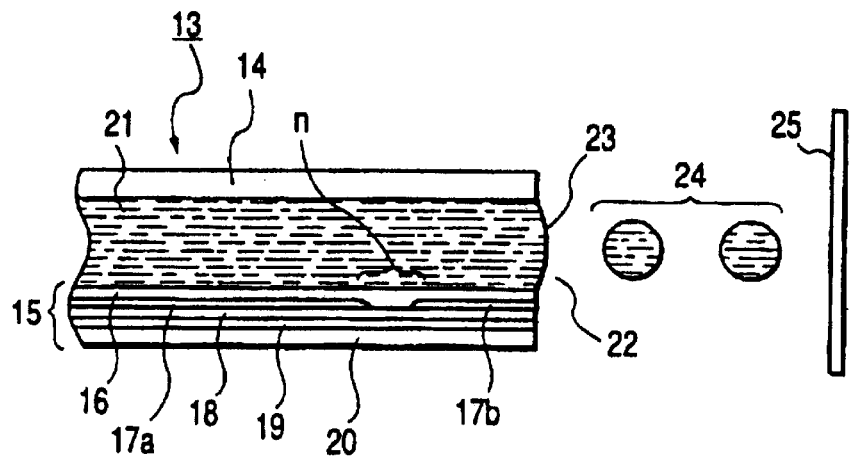

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2 and 7 is confirmed.

Claims 1, 3 and 5 are cancelled.

Claims 4, 6 and 8–10 are determined to be patentable as amended.

Claim 11, dependent on an amended claim, is determined to be patentable.

4. [The fluorine-containing epoxy resin composition according to claim 3.] *A flourine-containing epoxy resin composition having in one molecule at least one perfluoroalkyl group having 6 to 12 carbon atoms and at least two alicyclic epoxy groups, and a cationic polymerization catalyst, wherein the resin comprises a monomer unit having a C—C bond, the C—C bond constituting the main chain of the resin, and* wherein the fluorine-containing epoxy resin is an epoxy polymer represented by the following Formula (A-3):

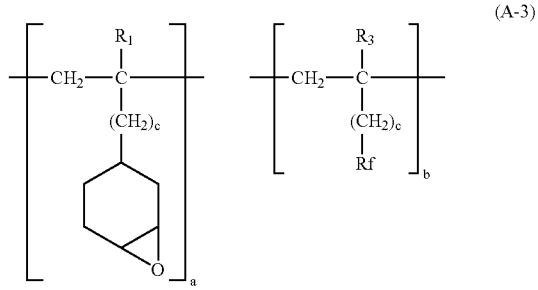

$R_1, R_3 = H$ or $CH_3$
a = 2-50
b = 2-50
c = 0-3
$Rf = CF_3—(CF_2)_x—$  x = 5-11 or $$\begin{array}{c} CF_3 \\ \phantom{xx}\diagdown \\ \phantom{xxx}CF—(CF_2)_y— \\ \phantom{xx}\diagup \\ CF_3 \end{array} \quad y = 3\text{-}9.$$

6. [The fluorine-containing epoxy resin composition according to claim 3.] *A flourine-containing epoxy resin composition having in one molecule at least one perfluoroalkyl group having 6 to 12 carbon atoms and at least two alicyclic epoxy groups, and a cationic polymerization catalyst, wherein the resin comprises a monomer unit having a C—C bond, the C—C bond constituting the main chain of the resin, and* wherein the fluorine-containing epoxy resin is an epoxy polymer represented by the following Formula (A-5):

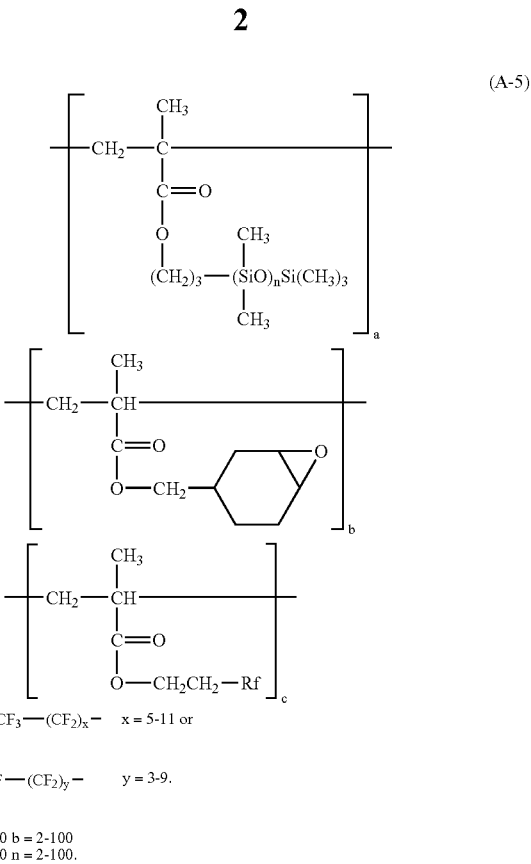

$Rf = CF_3—(CF_2)_x—$  x = 5-11 or $$\begin{array}{c} CF_3 \\ \phantom{xx}\diagdown \\ \phantom{xxx}CF—(CF_2)_y— \\ \phantom{xx}\diagup \\ CF_3 \end{array} \quad y = 3\text{-}9.$$

a = 1-50 b = 2-100
c = 1-50 n = 2-100.

8. A surface treatment process for treating a surface of a substrate selectively, *the surface of the substrate being a discharge opening surface of an ink jet recording head,* which *process* comprises successively:

a first step of applying [the flourine-containing epoxy resin composition according to any one of claims 1 to 3 and 7] *either:*
  *(a) a fluorine-containing epoxy resin composition comprising:*
    *an epoxy compound represented by the following Formula (A-1):*

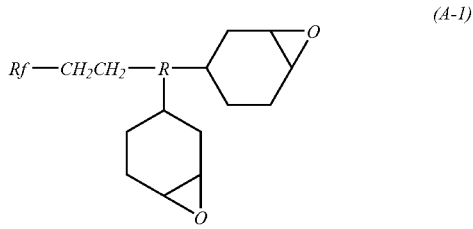

$Rf = CF_3—(CF_2)_x—$  x = 5–11 or $$\begin{array}{c} CF_3 \\ \phantom{xx}\diagdown \\ \phantom{xxx}CF—(CF_2)_y— \\ \phantom{xx}\diagup \\ CF_3 \end{array} \quad y = 3\text{--}9$$

*wherein R is an aliphatic residue for linking monomers each having an alicyclic epoxy group, the aliphatic residue having a main chain consisting of carbon and oxygen atoms, and a cationic polymerization catalyst;*
  *(b) a fluorine-containing epoxy resin composition comprising:*
    *an epoxy compound represented by the following Formula (A-2):*

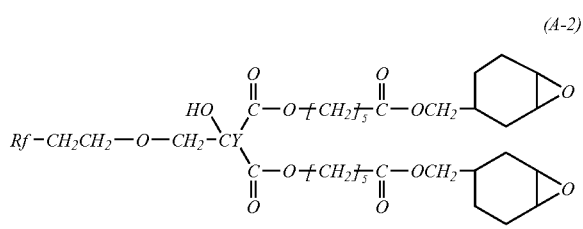

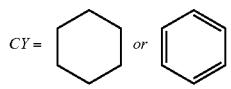

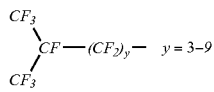

and a cationic polymerization catalyst;

(c) a fluorine-containing epoxy resin composition having in one molecule at least one perfluoroalkyl group having 6 to 12 carbon atoms and at least two alicyclic epoxy groups, and a cationic polymerization catalyst, wherein the resin comprises a monomer unit having a C—C bond, the C—C bond constituting the main chain of the resin; or (d) a fluorine-containing epoxy resin composition comprising:

a fluorine-containing epoxy resin having in one molecule at least one perflouroalkyl group having 6 to 12 carbon atoms and at least two alicyclic epoxy groups, and a cationic polymerization catalyst, wherein the resin composition of (d) further comprises, as a compatibilizing agent, at least one of compounds represented by the following Formulas (C-1) and (C-2):

a second step of irradiating the applied composition with activation energy radiation in a pattern through a mask;

a third step of dissolving and removing a part of the applied composition not irradiated with the activation energy radiation, by use of a liquid capable of dissolving the uncured composition; and if desired a fourth step of post-curing the remaining composition.

9. A surface treatment process for treating a surface of a substrate selectively, *the surface of the substrate being a discharge opening surface of an ink jet recording head,* which *process* comprises successively:

a first step of applying[the fluorine-containing epoxy resin composition according to any one of claims 1 to 3 and 7] *either:*

(a) *a fluorine-containing epoxy resin composition comprising:*

*an epoxy compound represented by the following Formula (A-1):*

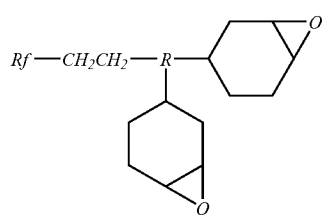

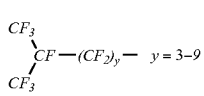

*wherein R is an aliphatic residue for linking monomers each having an alicyclic epoxy group, the aliphatic residue having a main chain consisting of carbon and oxygen atoms, and a cationic polymerization catalyst;*

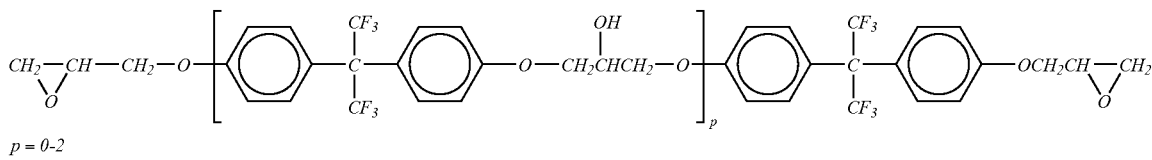

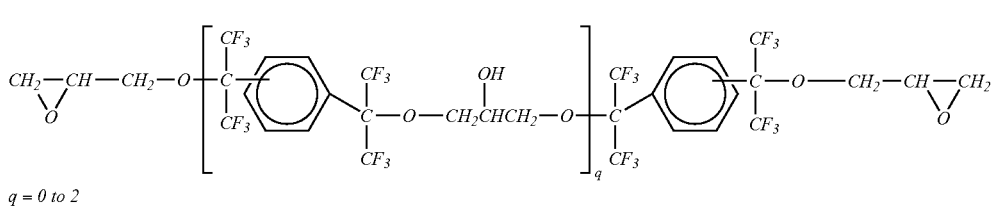

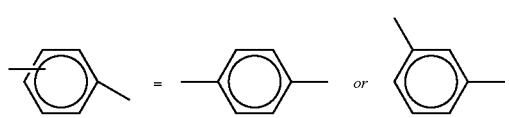

onto [a] *the surface of the* substrate and drying the applied resin composition;

(b) *a fluorine-containing epoxy resin composition comprising:* an epoxy compound represented by the following Formula (A-2):

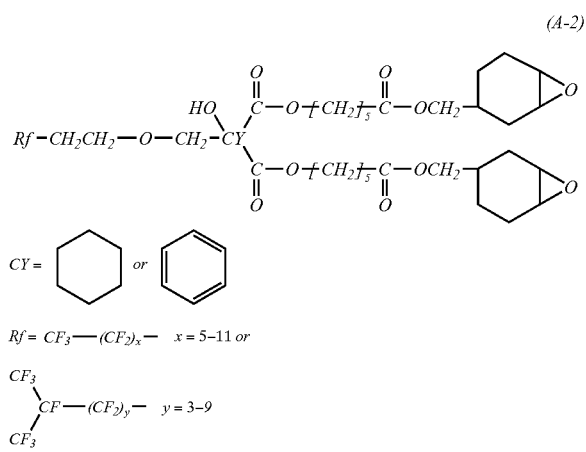

and a cationic polymerization catalyst;
(c) a fluorine-containing epoxy resin composition having in one molecule at least one perfluoroalkyl group having 6 to 12 carbon atoms and at least two alicyclic epoxy groups, and a cationic polymerization catalyst, wherein the resin comprises a monomer unit having a C—C bond, the C—C bond constituting the main chain of the resin; or
(d) a fluorine-containing epoxy resin composition comprising:
a fluorine-containing epoxy resin having in one molecule at least one perflouroalkyl group having 6 to 12 carbon atoms and at least two alicyclic epoxy groups, and a cationic polymerization catalyst,
wherein the resin composition of (d) further comprises, as a compatibilizing agent, at least one of compounds represented by the following Formulas (C-1) and (C-2):

a second step of heating or irradiating with activation energy radiation the applied composition to effect polymerization and curing over a whole area thereof;
a third step of selectively irradiating the cured composition with breaking activation energy radiation to partly remove the cured composition; and if desired
a fourth step of post-curing the remaining composition.

10. An ink jet recording head having a discharge opening surface with a discharge opening for discharging a recording liquid therethrough, wherein at least a discharge opening formed portion of the discharge opening surface is coated with a cured film comprising [the fluorine-containing epoxy resin composition as set forth in any one of claims 1 to 3 and 7.] *either:*
(a) *a fluorine-containing epoxy resin composition comprising:*
*an epoxy compound represented by the following Formula (A-1):*

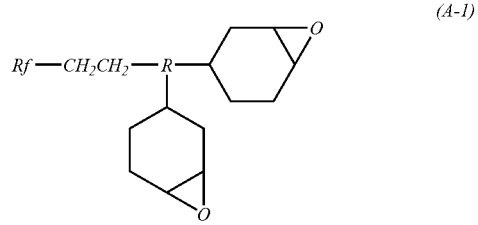

*wherein R is an aliphatic residue for linking monomers each having an alicyclic epoxy group, the aliphatic residue having a main chain consisting of carbon and oxygen atoms, and a cationic polymerization catalyst;*
(b) *a fluorine-containing epoxy resin composition comprising:*

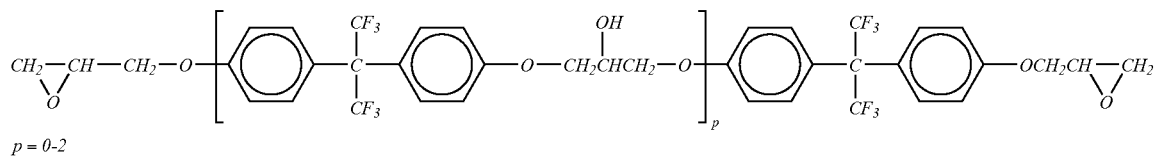

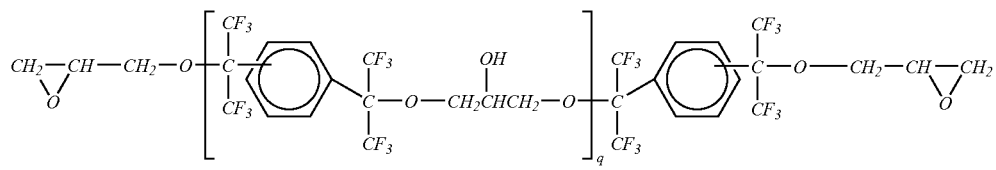

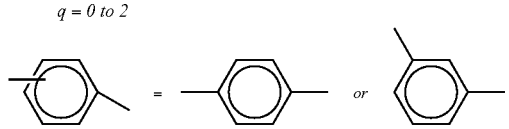

onto [a] *the surface of the* substrate and drying the applied resin composition;

*an epoxy compound represented by the following Formula (A-2):*

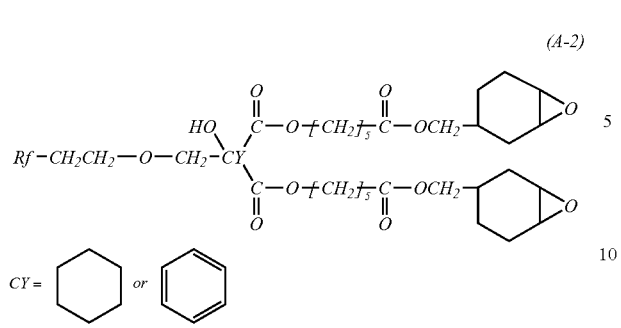

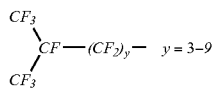

$Rf = CF_3\text{—}(CF_2)_x\text{—}$  $x = 5\text{–}11$ or $\underset{CF_3}{\overset{CF_3}{\phantom{|}}}CF\text{—}(CF_2)_y\text{—}$  $y = 3\text{–}9$ and a cationic polymerization catalyst;

(c) a fluorine-containing epoxy resin composition having in one molecule at least one perfluoroalkyl group having 6 to 12 atoms and at least two alicyclic epoxy groups, and a cationic polymerization catalyst, wherein the resin comprises a monomer unit having a C—C bond, the C—C bond constituting the main chain of the resin; or (d) a fluorine-containing epoxy resin composition comprising:

a fluorine-containing epoxy resin having in one molecule at least one perflouroalkyl group having 6 to 12 carbon atoms and at least two alicyclic epoxy groups, and a cationic polymerization catalyst, wherein the resin composition of (d) further comprises, as a compatibilizing agent, at least one of compounds represented by the following Formulas (C-1) and (C-2):

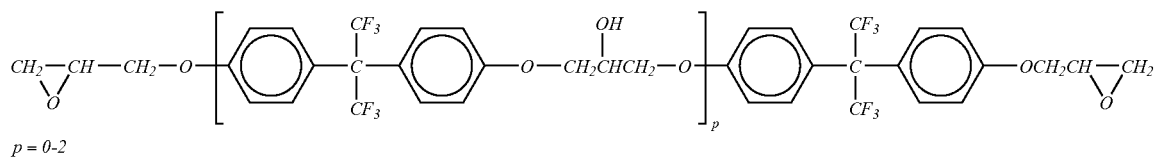

$p = 0\text{-}2$

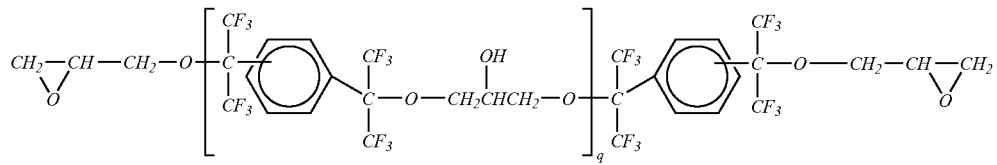

$q = 0$ to $2$

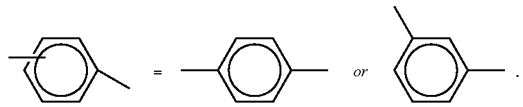

* * * * *